Feb. 14, 1956
C. W. THOMAS
2,735,055
CONTROL CIRCUIT FOR DYNAMIC BRAKING
Filed Jan. 12, 1952
2 Sheets-Sheet 1
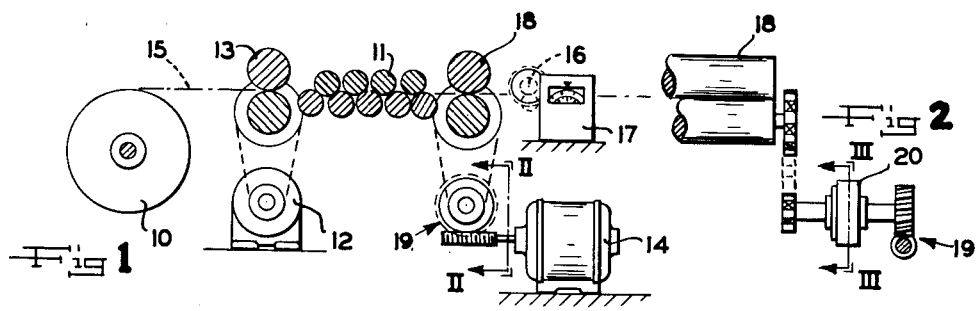
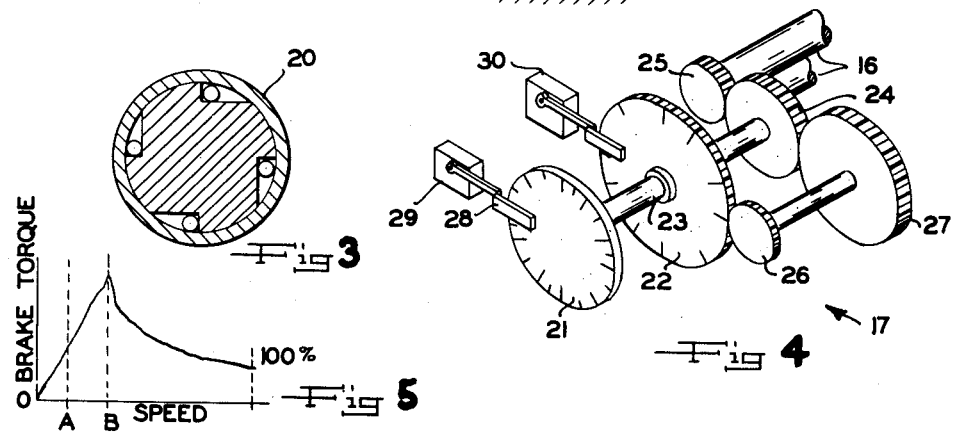
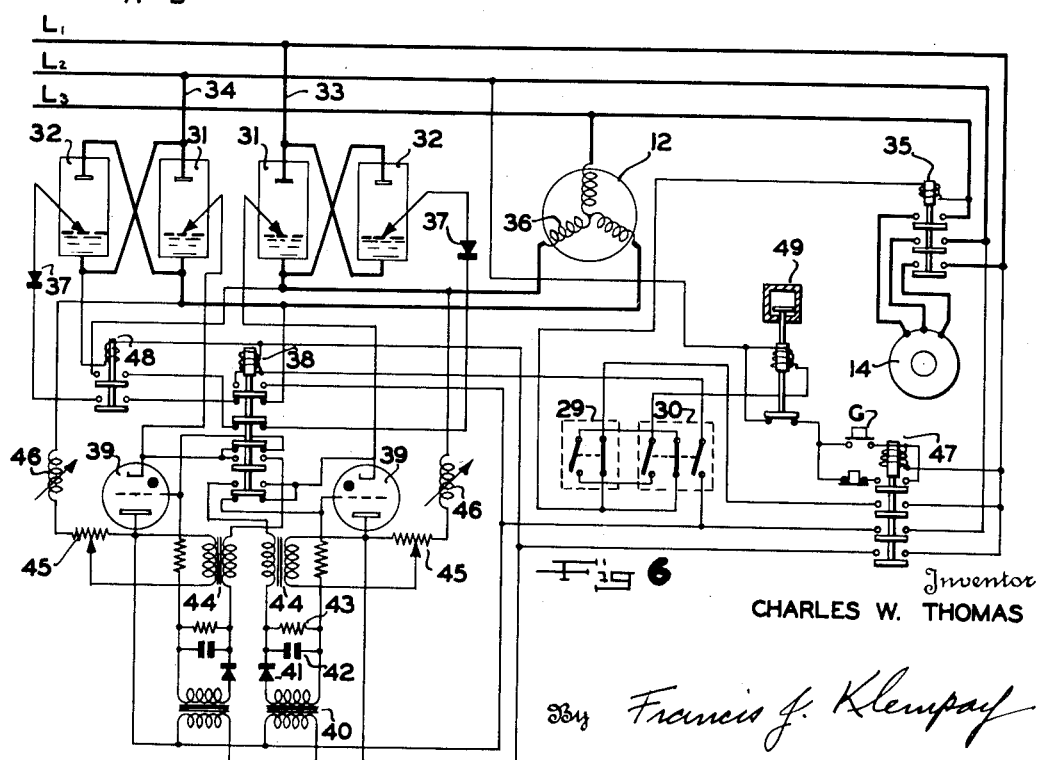
Inventor
CHARLES W. THOMAS
By Francis J. Klempay
Attorney Feb. 14, 1956

C. W. THOMAS 2,735,055

CONTROL CIRCUIT FOR DYNAMIC BRAKING

Filed Jan. 12, 1952

INVENTOR
CHARLES W. THOMAS

BY Francis J. Klempay

ATTORNEY ically braking

United States Patent Office
2,735,055
Patented Feb. 14, 1956

2,735,055

CONTROL CIRCUIT FOR DYNAMIC BRAKING

Charles W. Thomas, Warren, Ohio, assignor to The McKay Machine Company, Youngstown, Ohio, a corporation of Ohio Application January 12, 1952, Serial No. 266,211

2 Claims. (Cl. 318—212)

This invention relates to control arrangements for electrical devices and more particularly to a novel utilization of electronic contactors for the controlling of intermittently operated heavy-duty equipment. The present invention finds particularly advantageous application in controlling large electrical motors, the nature of operation of which requires frequent stopping and starting and/or dynamic braking of the apparatus.

A commonly practiced method of dynamicly braking motors comprises the use of a conventional induction motor the stator coils of which may be selectively connected to either an A. C. or D. C. source of power. A strong braking effect may be obtained by substituting D. C. voltage for the normal A. C. operating voltage. The magnetic field formed in the stator coils by the application of direct current is of a constant and stationary nature. As the rotor continues to revolve in this stationary field a high current is generated within the bars or coils of the rotor which reacts with the stator field to produce a torque which acts in opposition to the rotation of the motor and thus quickly brings it to a stop. It is an object of this invention to provide a novel and extremely simple arrangement for effecting a transfer of power from A. C. to D. C. for the dynamic braking of induction motors, for example, or for such other applications as may usefully employ controls of this nature.

In operation as above contemplated, wherein relatively heavy-duty equipment is subject to intermittent operation and/or dynamic braking, mechanical current controlling contactors heretofore utilized have of necessity been of a heavy-duty nature to withstand the constant use and high current demands during starting and braking. The contacts are of course subject to considerable pitting and burning and generally require frequent replacement. For this reason the use of conventional magnetic contactors is often economically undesirable or prohibitive. It is therefore another object of this invention to provide a novel control arrangement for accomplishing the above mentioned result incorporating electronic valve contactors to control the flow of current through the main conductors.

Another object of the present invention is the provision of a novel switching means utilizing unidirectional current valves whereby both A. C. and D. C. potentials may be supplied from the same source and controlled through selective energization of the current valves. It will be understood that by this arrangement I eliminate the need for installing an additional D. C. source for applying the braking potential and further eliminate the additional heavy-duty contactors which have heretofore been required for controlling the D. C. braking potential.

One of the precautions requisite to obtaining satisfactory results using dynamic braking is that of avoiding excessive heating of the motor. As will be understood the braking current produced in the rotor of a conventional squirrel cage type induction motor will be dependent upon the intensity of the stator field as well as the rotational speed of the rotor, and will ordinarily be of high magnitude since there is negligible resistance in the conductor bars. Also, it will be understood that in such motors the entire amount of heat developed during braking must be dissipated within the motor itself. Thus unless the magnitude of the D. C. braking current and resulting stator field is closely controlled the motor is likely to be severely damaged through overheating.

Overheating may, of course, be greatly minimized by utilizing a wound rotor type induction motor, the secondary of which is connected through slip rings to external resistances; which resistances then serve to dissipate a major portion of the heat developed. Motors of the wound rotor type, however, are considerably more costly than the squirrel cage type and are generally not as rugged and durable in operation. For this reason it is often desirable to utilize the squirrel cage type motor and incorporate suitable current limiting means to control the D. C. field of the stator. In this interest it is another object of this invention to provide an accurate, easily controllable, and electrically efficient means of regulating the stator field during braking.

Yet another and more specific object of the invention is the provision of improved control means for controlling metal processing lines, for example, whereby the same will be operative to feed strip in predetermined lengths with extreme accuracy and with a minimum loss of time during the slow down and stopping period.

Other objects and advantages of the invention will become apparent upon full consideration of the following detailed specification and accompanying drawing wherein is disclosed a certain preferred embodiment of the invention.

In the drawing:

Figure 1 is a schematic view of a metal processing line utilizing the control of my invention to accurately regulate the movement of the stock;

Figure 2 is a fragmentary sectional view taken along line II—II of Figure 1 showing a slow speed stock feeding means;

Figure 3 is a fragmentary sectional view taken along line III—III of Figure 2 showing an overrunning type clutch as incorporated in the feeding means of Figure 2;

Figure 4 is a schematic view of a stock feed measuring device utilized in the apparatus of Figure 1;

Figure 5 is a graphic representation of torque versus percent of slip in the dynamic braking of a typical induction motor;

Figure 6 is a schematic wiring diagram of an illustrative control embodying the teachings of my invention as used in controlling the processing line of Figure 1.

Figure 7:
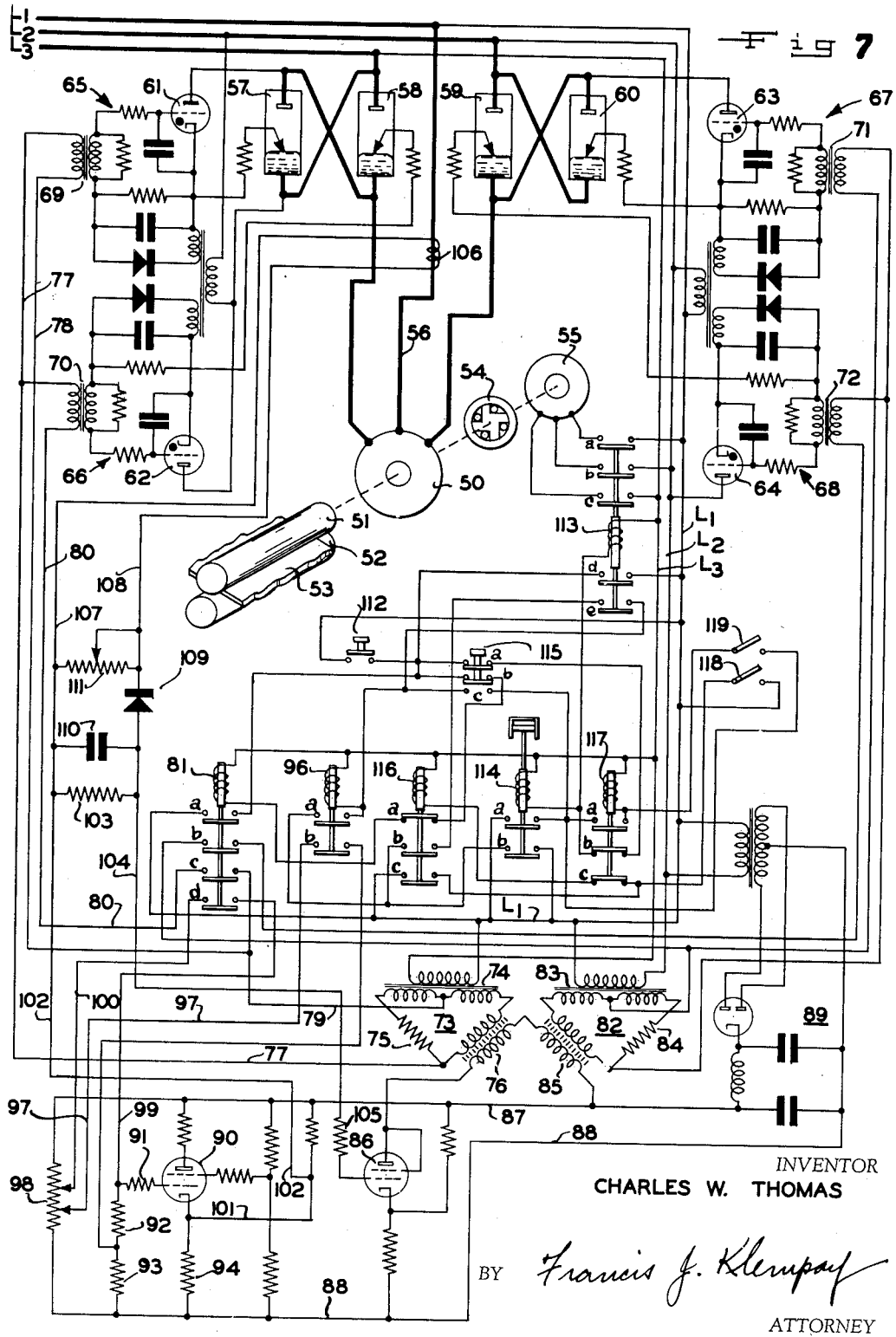
Figure 7 is a schematic wiring diagram of yet another embodiment of my invention wherein is incorporated additional current regulating means for obtaining optimum motor efficiency.

In the embodiment of the invention illustrated in Figures 1–6 the reference numeral 10 represents a strip uncoiler from which stock 15 may be fed into a leveler comprised of the the rolls 11, 13 and 18 and thence into a shear or other metal working device, not shown. The feeding is accomplished primarily by means of a motor 12 which is operatively connected to the leveler, but as will be understood more fully upon complete consideration of the specification, a second motor 14 is utilized to accurately feed the stock 15 into its final position.

In highly repetitive operations, wherein the control of my invention may be most usefully employed, accuracy in feeding is of paramount importance to the economic success of the job. In attempt to maintain a reasonable degree of accuracy it is presently common practice to utilize an accurate measuring device, as for example that shown at 17, which is operative to control the main drive motor 12 in response to a predetermined angular movement of measuring rolls 16 through which the stock 15 is caused to pass. In order to avoid overtravel of the stock 15 due to the high inertia of the feeding and leveling apparatus it has been proposed to provide a "slow down" switch which is actuated by the measuring device 17 and which is operative at a predetermined point in the feeding cycle to cause the drive motor 12 to operate at a very slow speed. Thus when the stopping point is reached a "stop" switch is actuated by the measuring device 17 to stop the motor 12 with relatively little coasting.

This method is nevertheless subject to many variable factors, such as bearing friction and fluctuations in feed velocity, for example, which cause inherent inaccuracies in feeding. Thus it is necessary to provide a substantial tolerance in the increment of stock to be fed in order to insure against occasional underfeeding which generally renders the stock totally worthless. The tolerance required represents a considerable waste of valuable material which may be greatly minimized by the control of my invention as will become apparent.

In the first illustrated embodiment of my invention, I use an auxiliary motor 14 which drives the leveler 11, 13, 18 through a worm gear or other suitable speed reducing device 19. The leveler 11, 13 and 18 will of course be driven at a much slower speed by motor 14 and for this reason I provide an overrunning clutch 20 which connects the leveler to the speed reducing means 19 and thus permits the rolls thereof to overrun the slow speed driving means while the stock is being fed at high speed by the motor 12.

In the proposed stock feeding method a cycle is begun by starting motors 12 and 14. The stock is then fed at high speed by the motor 12 while the auxiliary motor 14 merely idles. The measuring device 17, which comprises a slow-down and a stop switch, operates at a predetermined point in the feeding cycle to dynamically brake the motion of the main drive motor 12 to cause the feeding and processing equipment to rapidly slow down. After sufficient reduction of speed the auxiliary motor 14 begins to feed the stock. It will be noted that this slow speed feeding is accomplished against the restraining action of the dynamicly braked main motor 12. Thus, when the measuring device 17 operates to open the circuit to the auxiliary motor 14, the apparatus is quickly brought to a smooth stop by the retarded motor 12.

In Figure 5, wherein is shown a typical torque-speed curve for a dynamicly braked squirrel cage induction motor, it may be observed that maximum braking occurs at point "B" or at approximately ten percent of operating speed. Further, it will be observed that this curve approximates a straight line from zero torque to maximum for speeds less than that indicated by point "B." For this reason it is desirable, although not necessary, to operate the auxiliary drive within this range as, for example, five percent of the operating speed of the main motor 12.

Shown schematically in Figure 4 is a measuring device 17 which is of preferred construction for use in the control system of the illustrated feeding line. The device shown incorporates a pair of indicating discs 21 and 22, the outer disc 21 of which is secured to a rotatable shaft 23 and is adapted to rotate at a relatively high rate as, for example, a complete revolution per each foot of linear stock advance, and the inner disc 22 of which is rotatably journaled on the shaft 23 and is adapted to turn at a relatively slow rate as, for example, a partial revolution per each complete feeding cycle. A spur gear 24 is secured to the inner end of the shaft 23 and is rotated in accurate response to movement of the stock 15 by means of a pinion 25 which is keyed to the end of one of the measuring rolls 16. The outer disc 21, of course, rotates directly with the shaft 23 while the inner disc 22 is rotated at a reduced speed through gears 26 and 27. In the arrangement shown the discs 21 and 22 have outwardly extending arms 28 and 30; the said switches being respectively the stop and slow-down switches. Generally there is incorporated in apparatus of this nature resetting means, not shown, which is operative to initially postion the discs 21 and 23 and the arms 28 thereof in angularly displaced relation to the switches 29 and 30. Thus a predetermined increment of stock is measured and fed as the arms 28 rotate into the position shown in Figure 4 to trip both limit switches 29 and 30. It will be noted that the stop switch 29 will be tripped several times during the course of a single feeding cycle and it is therefore necessary to provide suitable circuiting to cause the said stop switch 29 to remain ineffective until such time as the slow-down switch 30 has been tripped. It will be apparent, however, that the arrangement shown provides for accuracy of a high degree since the position of final stop is governed in a sensitive manner by the rapidly rotating disc 21.

In the control circuit of my invention as shown in Figure 6, conductors L1, L2 and L3 provide a source of three phase power for operating the motors 12 and 14. As may be observed the motor 12 is directly connected to the conductor L3 but is connected to the conductors L1 and L2 by means of leads 33 and 34 into each of which is interposed a pair of inversely connected electronic discharge type contactors 31 and 32 by means of which the current flow to the motor 12 may be controlled and regulated as will be apparent. The auxiliary motor 14 is connected to the power source through a relay switch 35.

By the preferred method of operation as provided by the present invention the motors 12 and 14 are started simultaneously by closing the relay 35 and by causing the discharge devices 31 and 32 to fire continuously. The stock 15 is thus fed at high speed until the slow-down switch 30 is tripped, whereupon, by means to be hereinafter disclosed, one of the devices 32 of each pair is caused to stop firing. As will be understood the resulting flow of current to the motor 12 will be of a pulsating D. C. nature which when partially smoothed by the inherent inductance of the stator coils 36 has the effect of creating in the coils 36 a relatively constant and stationary magnetic field. As explained, the D. C. field causes a dynamic braking of the motor 12 which rapidly retards the feeding apparatus to the point at which the auxiliary motor 14 begins to feed the stock at slow speed. Continued feeding causes the stop switch 29 to be tripped, thereby deenergizing relay 35 and stopping the motor 14 while the D. C. braking current remains on for a predetermined time interval to bring the apparatus to a complete stop.

For controlling the firing of the discharge devices 32 I provide ignitor circuits including rectifiers 37 and normally closed contacts of relay 38; the arrangement thus being that the devices 32 will fire on alternate half cycle until such time as the slow-down switch 30 is tripped to energize relay 38 and open the ignitor circuits.

For controlling the firing of discharge devices 31 I have provided ignitor circuits comprising the anode-cathode circuits of conventional gaseous discharge devices 39. As will be apparent I may accurately control the effective current passing through the devices 31 by the expedient of applying grid control to the device 39 in such manner as to delay firing for a predetermined portion of each half cycle. It will of course be understood that during normal operation of the motor 12 it will be desirable to render the discharge devices 31 conductive over the full half cycle. This is accomplished by providing a circuit including normally closed contacts of relay 38 connecting the control grid of each device 39 with its cathode. Thus, having no negative hold-off bias, each of the devices 39 will fire over the full half cycle and will, of course, render the devices 31 conductive for the same period.

Delayed firing of the gaseous discharge devices 39 is generally desirable during braking of the motor 12 and this may be accomplished by providing each such device with a second grid circuit in parallel with the first and including normally open contacts of the relay 38. In each of the last mentioned grid circuits I conventionally provide a transformer 40, rectifier 41, capacitor 42 and resistor 43, which elements cooperatively serve to maintain a control bias sufficiently negative to render the devices 39 non-conductive. In accordance with usual practice I provide a transformer 44 the secondary of which is series connected in the grid circuit and the primary of which is connected to a source of voltage which is referenced to the plate voltage of the device 39. As may be observed from Figure 6 the control of the grid voltage for the gaseous discharge device 39 comprises a potentiometer 45 which is connected in series with a variable inductor 46. By suitable variation of the potentiometer 45 and inductor 46 it is possible to obtain a firing delay of infinite variation over a full half cycle and thus regulate the firing device 31 through relay 38. In this manner I may regulate the D. C. current to the motor 12 during braking as may best suit the results desired.

Since each device 31 must be controlled by a separate grid circuit as described above, it may be deemed desirable to provide mechanical interconnection, not shown, between the inductors 46 and between the potentiometers 45 whereby both devices 39 may be regulated equally by setting one potentiometer and one inductor.

The operational sequence of the electrical circuit is as follows: Start button G is pushed to energize relay 47, simultaneously energizing relays 35 and 48 and devices 39 to start the auxiliary motor 14 and fire devices 32 and 31, respectively. Thus both motors 12 and 14 operate at full speed; the drive motor 12 rapidly feeding the stock 15 while the auxiliary motor 14 idles under no load. Responsive to the feeding of a predetermined fraction of the predetermined stock increment the slow-down switch 30 trips energizing relay 38. The relay 38, when energized, opens the firing circuit of devices 32 rendering the same nonconductive, and also connects the firing delay controls into the grid circuits of the devices 31. The delay controls are, of course, pre-set as desired to cause the proper value of braking current to flow to the motor 12.

As the motor 12 is braked sufficiently to a speed corresponding to that indicated at A of Figure 5 the auxiliary motor 14 begins to feed the stock 15 at that speed. Feeding is continued at slow speed until the remaining fraction of the predetermined stock increment is registered by the measuring device 17, whereupon the stop switch 29 is tripped. Actuation of the latter switch 29 causes deenergization of relay 35, stopping the auxiliary motor 14, and causes energization of a time delay relay 49. After a predetermined time interval, during which the braking action of the drive motor 12 brings the feeding apparatus to a complete stop, the relay 49 opens deenergizing relay 47 to end the cycle. If desired suitable circuiting, not shown, may be utilized to reenergize relay 47 and cause automatic recycling of the apparatus.

In the second embodiment of my invention, illustrated in Figure 7, I have provided a dynamic braking control including automatic current control and regulating means for preventing excessive current flow through the main drive motor during starting and braking to effectively eliminate any overheating of the motor.

In my illustration I have shown schematically a main drive motor 50 which is operatively connected to feed rolls 51 and 52 which are adapted to feed strip 53, for example, longitudinally in the manner desired. Also connected to the feed rolls 51 and 52, through an overrunning clutch 54 is auxiliary motor 55, and as above suggested the motor 55 is of a type having a slow speed output shaft whereby during normal operation the main drive motor 50 will rotate rolls 51 and 52 at high speed while overrunning the auxiliary motor 55 through clutch 54.

Drive motor 50 is preferably of a three-phase type and is adapted to be connected to a source of electrical power, not shown, through line conductors L1, L2 and L3. A direct connection is made to L1 through conductor 56 while connection is made to conductors L2 and L3 through inverted pairs of mercury arc discharge devices 57–60. Each of the discharge devices 57–60 is controlled by one of a plurality of associated gaseous discharge devices 61–64 in the conventional manner and thus the control procedure taught by my invention is effected through appropriate control of the latter discharge devices 61–64. Discharge devices 61–64 are maintained normally non-conductive through control circuits 65–68 respectively, which circuits are provided with impulse transformers 69–72 respectively for rendering discharge devices 61–64 conductive when desired to energize and operate the main drive motor 50.

Transformers 69 and 70 control the firing of gaseous discharge devices 61 and 62 and accordingly of mercury arc discharge devices 57 and 58. Thus by providing transformers 69 and 70 with suitable control signals I may accurately control and regulate the flow of current between line conductor L3 and the drive motor 50. In the illustrated embodiment of the invention such control signals are provided by means of a bridge network 73 including a transformer 74, resistor 75 and saturable core reactor 76 connected in series to form a completed circuit. Signal potential to be applied to transformers 69 and 70 is obtained at a center tap of the secondary winding of transformer 74 and at a point in the network circuit between resistor 75 and reactor 76. Conductor 77 connects the last mentioned point and one terminal of each of the transformers 69 and 70. The other terminal of transformer 69 is connected directly to the center tap of transformer 74 through conductors 78 and 79, while the other terminal of transformer 70 connects the center tap through conductors 80 and 79, and normally open contacts 81c of a control relay 81 to be hereinafter described. The primary winding transformer 74 is connected across line conductors L1 and L3 whereby firing impulses may be applied to transformers 69 and 70 in controlled phase relationship to the anode-cathode potential appearing across the mercury arc discharge devices 57 and 58. Thus it will be apparent that by adjustment of the bridge network 73 I may shift the firing point of discharge devices 57 and 58 whereby accurate control of the current passing therethrough may be obtained. The presently described embodiment of the invention discloses means, to be later described, for automatically adjusting the network 73 in response to current flow through the main drive motor 50 whereby the R. M. S. value of current may be maintained within a predetermined practical maximum value to prevent overheating of the apparatus.

A similar bridge network 82, including transformer 83, resistor 84 and saturable core reactor 85, is provided for operating firing transformers 71 and 72. The primary winding of transformer 83 is connected across line conductors L1 and L2 whereby signals impressed upon firing transformers 71 and 72 are in controlled phase relationship with the anode-cathode potential appearing across mercury discharge devices 59 and 60, and as in the above described circuit arrangement the circuit path to firing transformer 72 includes normally open contacts 81b of relay 81.

For controlling the phase relationship of the firing signals derived from bridge networks 73 and 82 I have connected the primary windings of saturable core reactors 76 and 85 in series with a grid controlled space discharge device 86; the arrangement being such that variations in the conduction of discharge device 86 will cause corresponding variations in the saturation of the reactors 76 and 85 to vary the effect thereof upon the bridge networks 73 and 82. In the specific circuit illustrated the effect of varying conduction in discharge device from zero to full conduction is to vary the phase relationship of the signals derived from bridges 73 and 82 from substantially 180° out of phase to substantially in phase. Thus it will be apparent that by causing conduction in space discharge device 86 to decrease in predetermined relation to increases in the current demand of drive motor 50 I may readily provide a predetermined maximum current flow through the motor 50 substantially regardless of the normal current demands thereof.

Anode-cathode potential for discharge device 86 is provided by means of conductors 87 and 88 which connect a source of D. C. potential designated generally by the reference numeral 89. Also connected across conductors 87 and 88 is another space discharge device 90 of the type having conventional control and screen grid electrodes. The control grid of discharge device 90 is connected through resistors 91, 92 and 93 to conductor 88 whereby the control grid is normally maintained near cathode potential. Connected in series with the cathode of discharge device 90 is a resistor 94, and connected to the said cathode through conductors 101, 102, resistor 103, conductor 104 and current limiting resistor 105 is the control grid of discharge device 86. It will thus be apparent that conduction in discharge device 90 will appear in magnified proportion in discharge device 86 to cause corresponding saturation of reactors 73 and 82.

It has been found desirable during certain portions of a normal control cycle to change the normal control grid bias of the discharge device 90 and for this purpose I have provided taps between each of the resistors 91, 92 and 93 leading to sources of bias potential which may be adjusted to some value which is more positive than the conductor 88. The tap between resistors 92 and 93 is connected through conductor 95, normally open contacts 96b of relay 96 and conductor 97 to a sliding tap of potentiometer 98 connected across the D. C. line conductors 87 and 88 whereby upon energization of relay 96 a positive grid bias is applied to discharge device 90. The tap between resistors 92 and 93 is connected through conductor 99, normally open contacts 81d and conductor 100 to a second sliding tap of potentiometer 98 whereby a positive control grid bias will also be applied to discharge device 90 upon energization of relay 81.

To correlate the current demands of the drive motor 50 with the rate of conduction in space discharge device 86 I have provided a current detecting coil 106 in magnetically coupled relation with the direct connected drive motor conductor 56 whereby any current passing through the conductor 56 will produce a proportionate potential at the terminals of the coil 106. Conductors 107 and 108 are connected to the terminals of coil 106 and to resistor 103 whereby the terminal potential of detector coil 106 may be applied into the control grid circuit of discharge device 86. A rectifying device 109, along with filtering capacitor 110 and potentiometer 111, is provided in the conductor 108 and it will be noted that the orientation of the rectifying device 109 is such that as current flow through conductor 56 increases a potential appears across resistor 103 which acts increasingly in opposition to the normal signal potential appearing across resistor 94. The resulting lowered control grid potential upon discharge device 86 effects a decrease in the saturation of reactors 76 and 85, causing a phase shift in the firing signal applied to firing transformers 69–72 and thereby rendering mercury arc discharge devices partially ineffective. A balance will of course be reached at some predetermined value of current flow through conductor 56, and such value may be regulated by adjustment of potentiometer 111 as will be understood.

The remaining components of the control circuit illustrated in Figure 7 may be best described in relation to the operation of the circuit which is as follows:

To start motors 50 and 55 to initiate feeding of the strip 53 start button 112 is closed to energize control relays 81, 113 and 114, the latter of which includes time delay means, schematically shown, whereby a predetermined time delay occurs between deenergization of the operating coil and opening of the contacts. The energizing circuit for relay 81 includes start button 112, normally closed contacts 115b of stop button 115 and normally closed contacts 116a of a control relay 116. Energizing circuits for relays 113 and 114 include start button 112, normally closed contacts 115a of the stop button and normally closed contacts 117b of a control relay 117.

Closing of contacts 81d causes a relatively high positive control grid bias to be applied to discharge device 90 which, in the manner described above, causes the firing signal from bridge networks 73 and 82 to be substantially in phase with the anode-cathode potentials of the discharge devices controlled thereby. Closing of contacts 81b and 81c connects firing transformers 70 and 72 to the bridge networks so that all four mercury discharge devices 57–60 are firing at substantially full effectiveness. Excessive inrush current through conductor 56 will, however, cause the discharge devices to be rendered less effective in the manner explained by reducing the saturation of reactors 76 and 85.

Closing of contacts 113a, 113b and 113c connects the auxiliary motor 55 to line conductors L1, L2 and L3 causing it to operate at full speed. In accordance with the teachings of the invention this speed is substantially slower than the speed of drive motor 50 and the auxiliary motor 55 is therefore merely overrun by the drive motor 50.

Upon feeding of a predetermined length of strip 53 a suitable measuring device, not shown, causes a slow-down switch 118 to be closed energizing slow-down relay 116. Opening of contacts 116a and closing of contacts 116b causes respectively the deenergization of relay 81 and the energization of relay 96. Deenergization of relay 81 disconnects firing transformers 70 and 72 from the bridge networks 73 and 82 and accordingly renders mercury arc discharge devices 58 and 59 totally nonconductive. Simultaneously the control grid bias connection for space discharge device 90 is shifted to the second of two potential taps at potentiometer 98 which may, for example, be at a lower potential value whereby rush current during dynamic braking may be maintained at a practical maximum.

After motor 50 has slowed to the speed of auxiliary motor 55 the latter continues to feed the stock 53 at slow speed against the restraining action of the former. Shortly thereafter a final stop switch 119 is closed by the measuring device, not shown, causing relay 117 to be energized. Contacts 117b and 117c open to deenergize relays 113, 114 and 116 to terminate further feeding of strip by auxiliary motor 55. A predetermined time delay period thereafter contacts 114a and 114b open to deenergize the entire circuit and terminate a feeding cycle. Suitable recycling devices, not shown, may be utilized to initiate a new cycle if desired. Otherwise start button 112 is closed to cause a subsequent length of strip to be fed.

For emergency stops button 115 may be pushed during a feeding operation to deenergize all relays except 96 and 117. Motor 50 will be braked to a stop in the usual manner and the circuit will be deenergized upon subsequent opening of contacts 114a and 114b.

It should thus be apparent that I have accomplished the objects initially set forth. My invention provides both normal energization control and an extremely simple arrangement for accomplishing dynamic braking of A. C. motors with relatively little special equipment and eliminates completely the need for the heretofore necessary D. C. supply source.

My arrangement is particularly well suited for use in applications wherein frequent stopping and starting is required and where current demands are relatively high. It is well known that for such operation frequent attention is required to maintain mechanical contactors in good operating order, while electronic contactors as proposed by my invention remain substantially unaffected by such severe use.

In the illustrated use of my control arrangements I make use of certain well known principles to provide a strip feeding device of high accuracy without compromise in speed of operation. The mere dynamic braking of the main drive motor 12 is insufficient for accurate feeding since, as may be observed from Figure 5 the braking torque is highly irregular over the entire speed range. This feature renders it very difficult to predict the distance in which the apparatus may be stopped from full speed. Further, various irregularities are likely to appear in successive cycles even after a stopping distance has been determined by trial and error. By providing an auxiliary driving motor which is operative to drive the feeding apparatus at a speed denoted by A of Figure 5 I eliminate all irregularities which may occur during braking from full speed to speed A and establish a known reference speed from which the drive motor may be accurately braked to a complete stop. It will be understood that this method is substantially as fast as braking the motor 12 continuously from full speed to full stop since the auxiliary motor 14 need operate but momentarily to establish the reference speed A. By properly adjusting the slow-down switch 30 with respect to the stop switch 29 the interval of time in which the motor 14 feeds at slow speed may be kept at a minimum.

In the embodiment of my invention illustrated in Figure 7 I have included control circuiting means additional to that shown in Figure 6 whereby the control procedure as taught generally herein may be effected in a most expeditious manner without danger of damaging the main drive motor through overheating. The arrangement shown in Figure 7 includes provisions for accurately adjusting and regulating the rush currents, both in starting and in braking whereby a maximum speed of operation may be obtained without overburdening the equipment.

Additional efficiency is gained by providing selectively adjustable reference potentials for control discharge device 90 whereby maximum rush current values may be selectively and independently regulated for both starting and braking periods and an optimum value may be obtained in each case without compromise to the other.

It will be understood however that the use of the control of my invention is not limited to the apparatus illustrated but may be effectively employed wherever electrical control of this nature may be desired. Reference should therefore be had to the appended claims to determine the full scope of the invention.

I claim:

1. In a motor control circuit for the normal operation and/or dynamic braking of induction motors and of the type having in combination with a motor a pair of inversely connected electric discharge devices connecting said motor with a source of A. C. electrical energy, firing circuits for each of said discharge devices, selectively operable means for rendering one of said discharge devices substantially non-conductive whereby a D. C. braking current may be supplied to said motor, and a firing circuit for the other of said discharge devices for varying the conductivity thereof; the improvement in said last mentioned firing circuit comprising a phase shifting bridge and means to alter said bridge in response to the flow of energy to said motor whereby the conductivity of the other of said discharge devices is reduced in response to excessive flow of energy to said motor.

2. In a motor control circuit for the normal operation and/or dynamic braking of three-phase induction motors the combination with a motor and three power lines connecting with the same of pairs of inversely related arc discharge devices connected in two of said power lines, selectively operable means of rendering one discharge device of each pair thereof nonconductive whereby D. C. braking current may be supplied to said motor, a firing circuit for the other discharge device of each pair thereof, and means in said firing circuits responsive to excessive flow of energy to said motor to reduce the conducting effectiveness of said last mentioned discharge devices.

References Cited in the file of this patent

UNITED STATES PATENTS

| | | |
|---|---|---|
| 1,911,356 | Eames | May 30, 1933 |
| 2,354,950 | Feldhausen | Aug. 1, 1944 |
| 2,448,256 | Elliot | Aug. 31, 1948 |
| 2,514,342 | Schoenbaum | July 4, 1950 |
| 2,529,490 | Field | Nov. 13, 1950 |
| 2,531,044 | Hibbert et al. | Nov. 21, 1950 |
| 2,539,468 | Pihl | Jan. 30, 1951 |
| 2,637,007 | Picking et al. | Apr. 28, 1953 |